Sept. 29, 1953   R. P. SEELIG   2,653,377
METHOD FOR FORMING METAL POWDER INTO A FLUID GUIDING BODY
Filed Sept. 2, 1947   7 Sheets-Sheet 1

INVENTOR.
RICHARD P. SEELIG
BY
J. O. Ollier
ATTORNEY

Sept. 29, 1953 R. P. SEELIG 2,653,377
METHOD FOR FORMING METAL POWDER INTO A FLUID GUIDING BODY
Filed Sept. 2, 1947 7 Sheets-Sheet 2
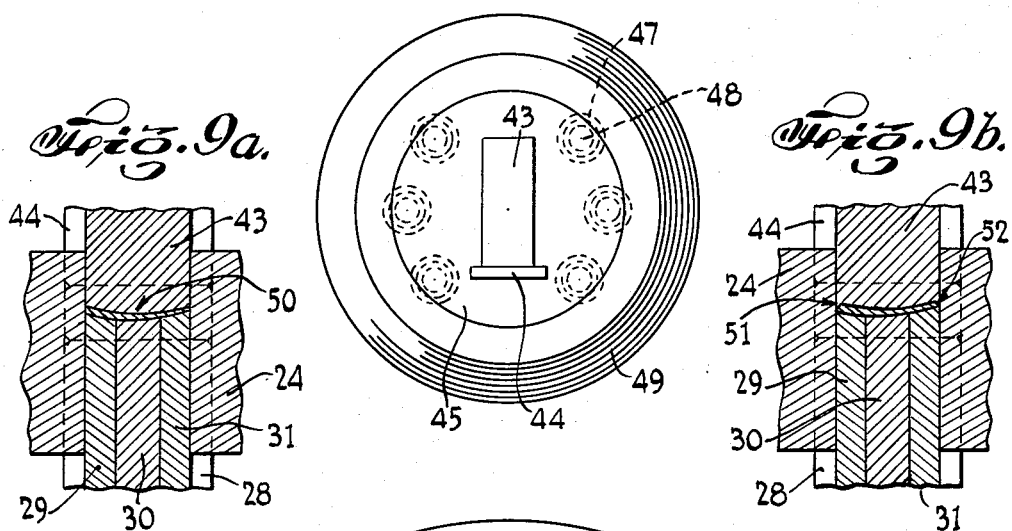
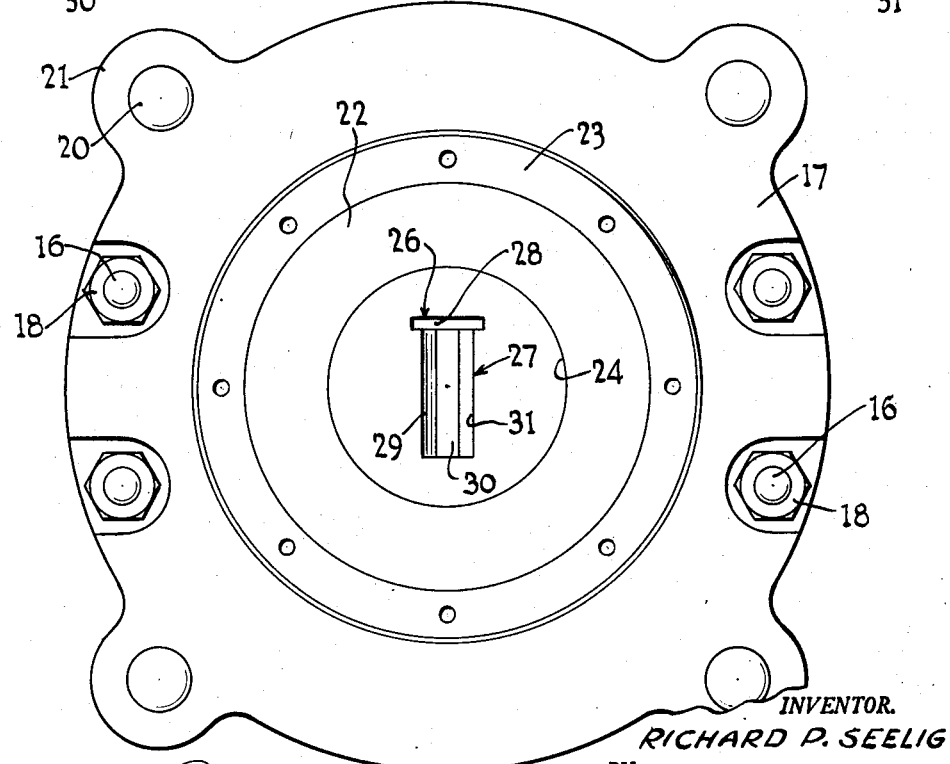
INVENTOR.
RICHARD P. SEELIG
BY
J. O. Ollier
ATTORNEY

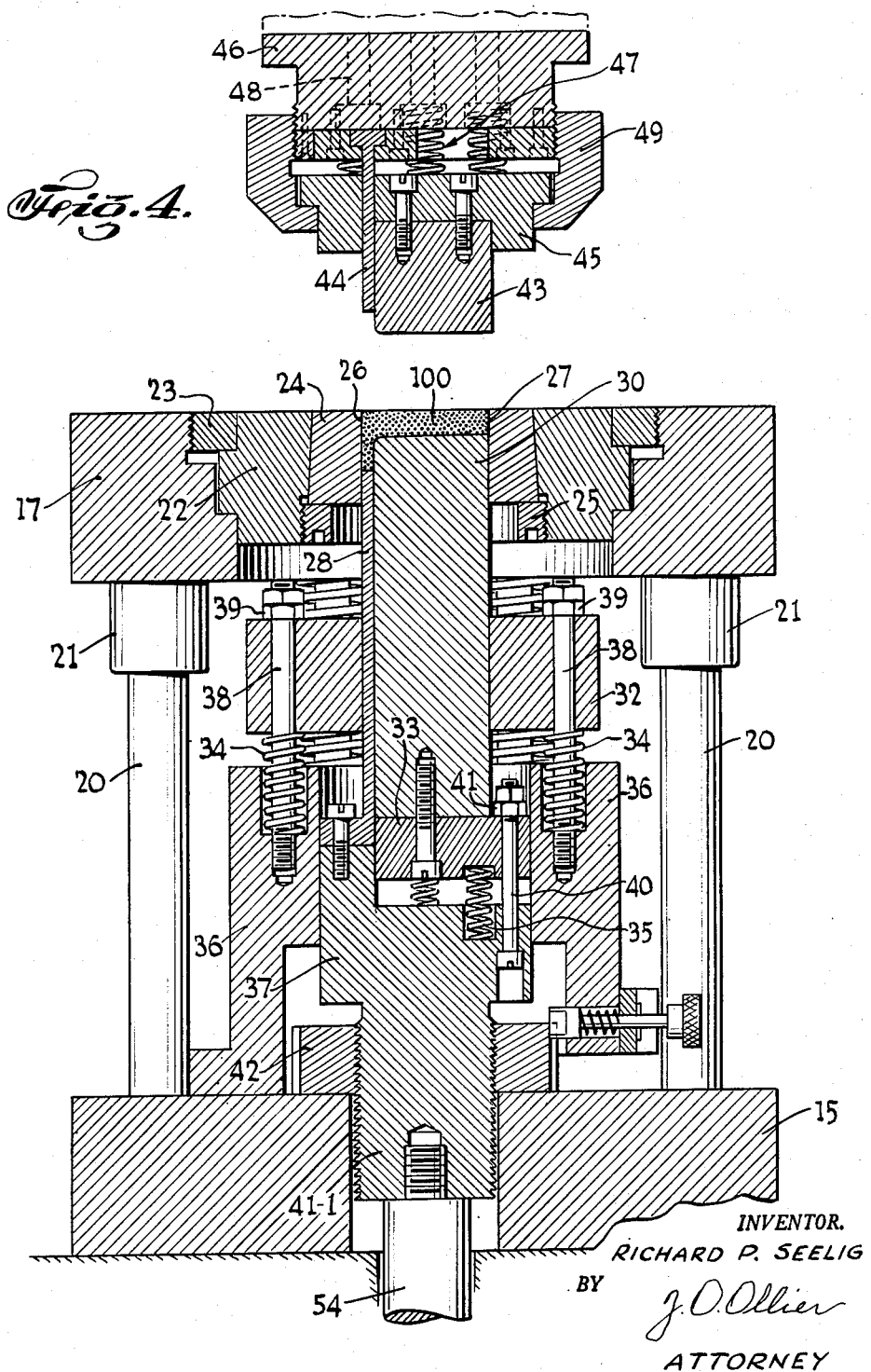

Sept. 29, 1953 R. P. SEELIG 2,653,377
METHOD FOR FORMING METAL POWDER INTO A FLUID GUIDING BODY
Filed Sept. 2, 1947 7 Sheets-Sheet 5
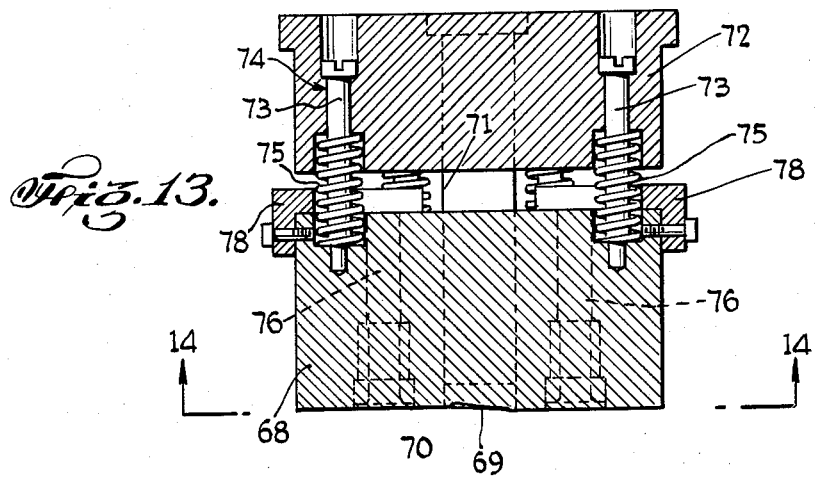
Fig. 13.
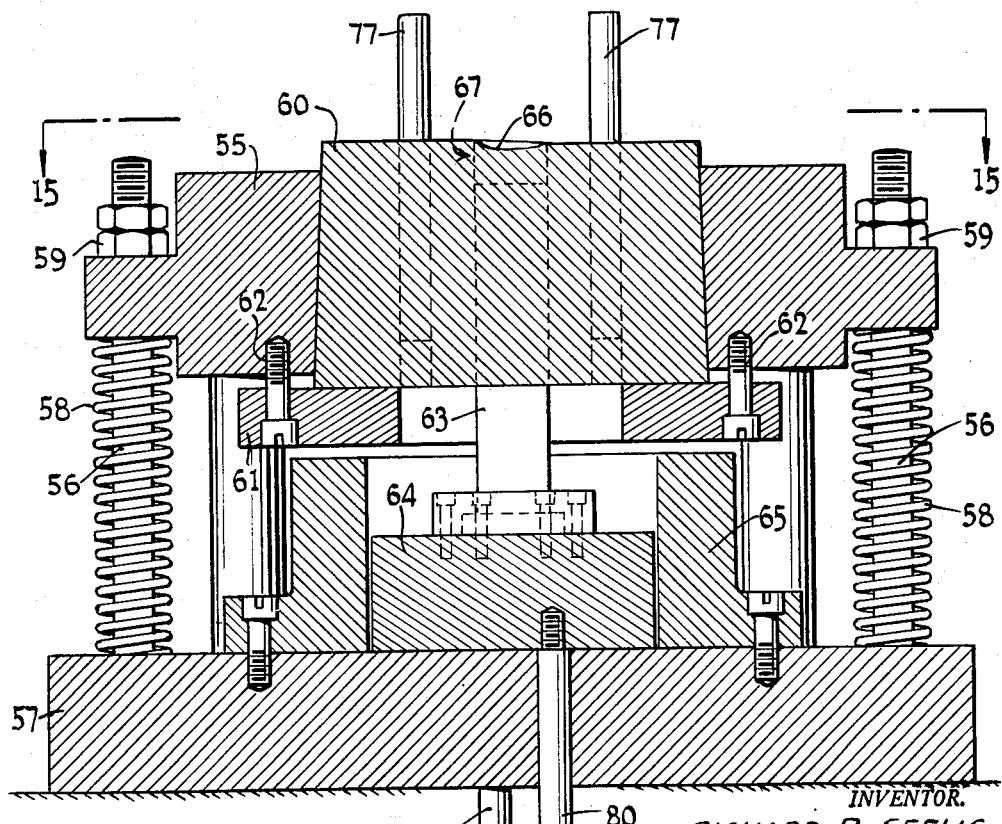
INVENTOR.
RICHARD P. SEELIG
BY
J. O. Ollier
ATTORNEY Sept. 29, 1953    R. P. SEELIG    2,653,377
METHOD FOR FORMING METAL POWDER INTO A FLUID GUIDING BODY
Filed Sept. 2, 1947    7 Sheets-Sheet 6
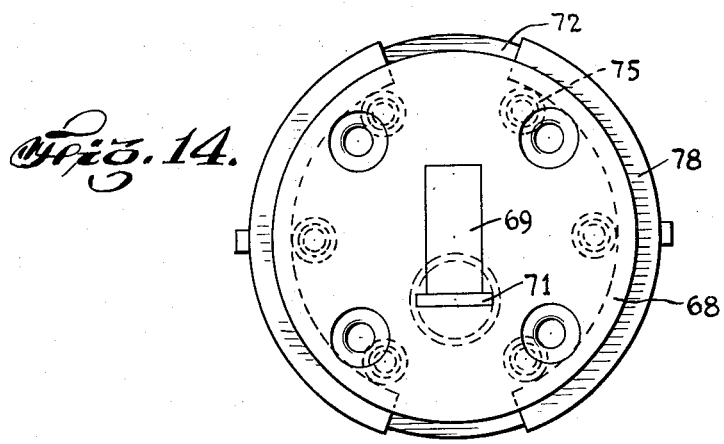
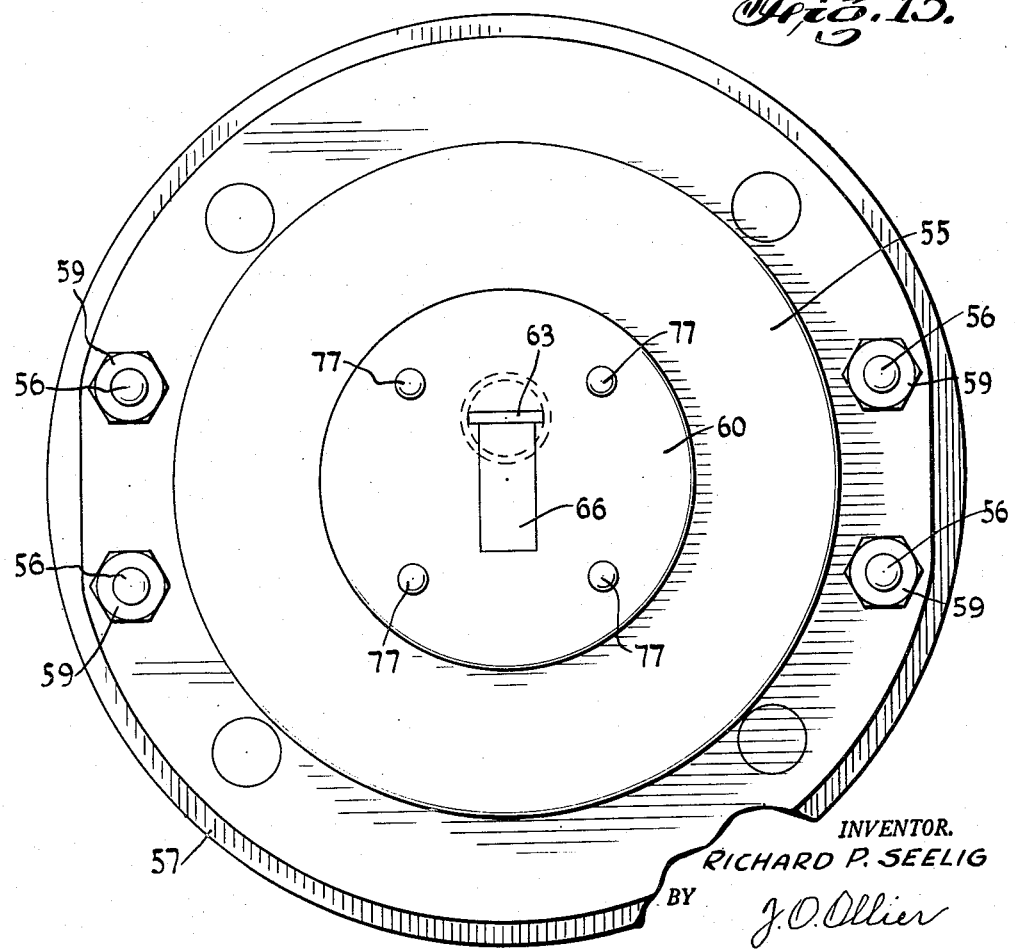
INVENTOR.
RICHARD P. SEELIG
BY
J. O. Ollier
ATTORNEY Sept. 29, 1953  R. P. SEELIG  2,653,377
METHOD FOR FORMING METAL POWDER INTO A FLUID GUIDING BODY
Filed Sept. 2, 1947  7 Sheets-Sheet 7
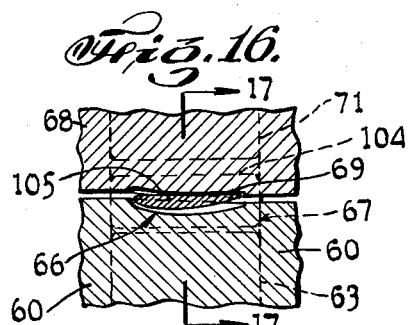
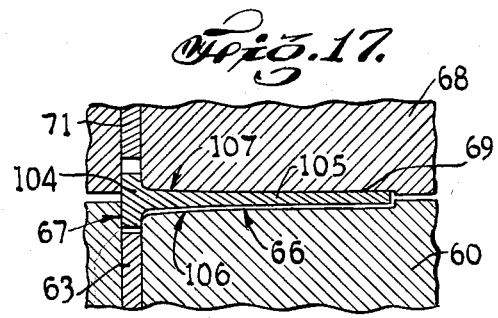
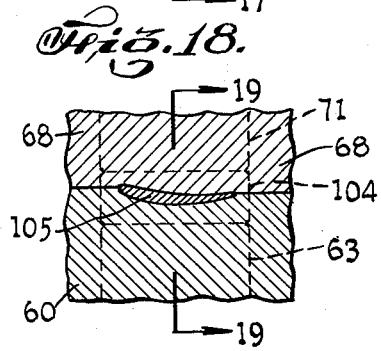
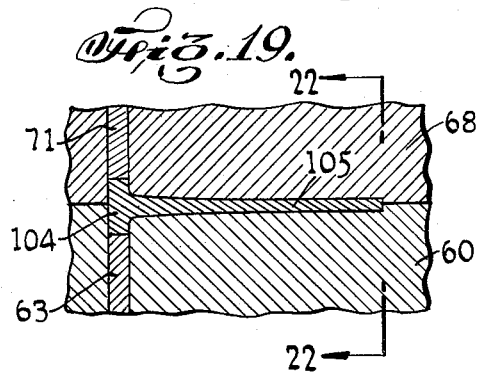
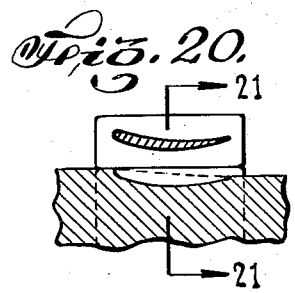
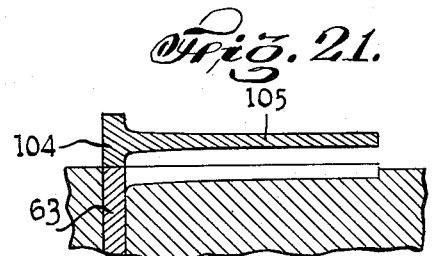
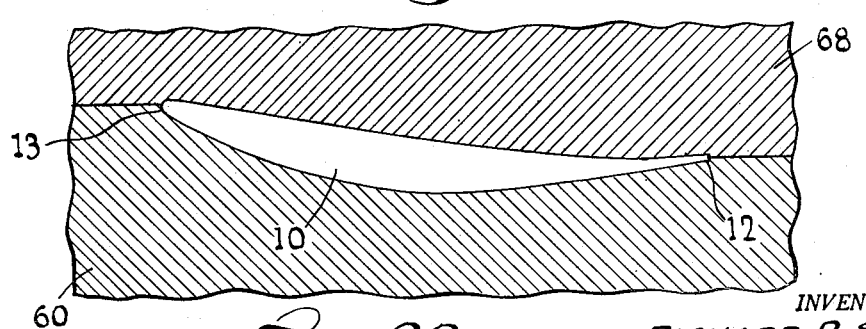
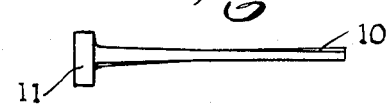
INVENTOR.
RICHARD P. SEELIG
BY
J. O. Ollier
ATTORNEY Patented Sept. 29, 1953

2,653,377

UNITED STATES PATENT OFFICE 2,653,377

METHOD FOR FORMING METAL POWDER INTO A FLUID GUIDING BODY

Richard P. Seelig, Elmhurst, N. Y., assignor to American Electro Metal Corporation, Yonkers, N. Y., a corporation of Delaware Application September 2, 1947, Serial No. 771,637

4 Claims. (Cl. 29—156.8)

1

This invention relates to the manufacture of blades or vanes and similar parts of turbines, particularly gas turbines and compressors, which are difficult to manufacture by casting and forging methods especially because of the finishing operations subsequently required. Such a part usually consists of a blade proper and a root for securing it to a support. The blade is curved and twisted and not of simple geometric shape.

It is an object of the invention to produce such parts in a powder metallurgical process, from the powders of metal of which the blade or vane is to consist.

It is a further object of the invention to produce such parts in a combined powder metallurgical and infiltration process in which one or more kinds of metal-powder are pressed to desired porous shape and afterwards infiltrated by another kind of metal or metals of lower melting point than that of the first mentioned kind.

It is another object of the invention to render more simple and inexpensive the manufacture of parts of complicated or intricate shape, such as blades and buckets.

It is a still further object of the invention to manufacture, in simple and inexpensive mass production, blades and similar shapes of rather complicated and intricate configuration so that the final articles are within close tolerances.

Figure 1:
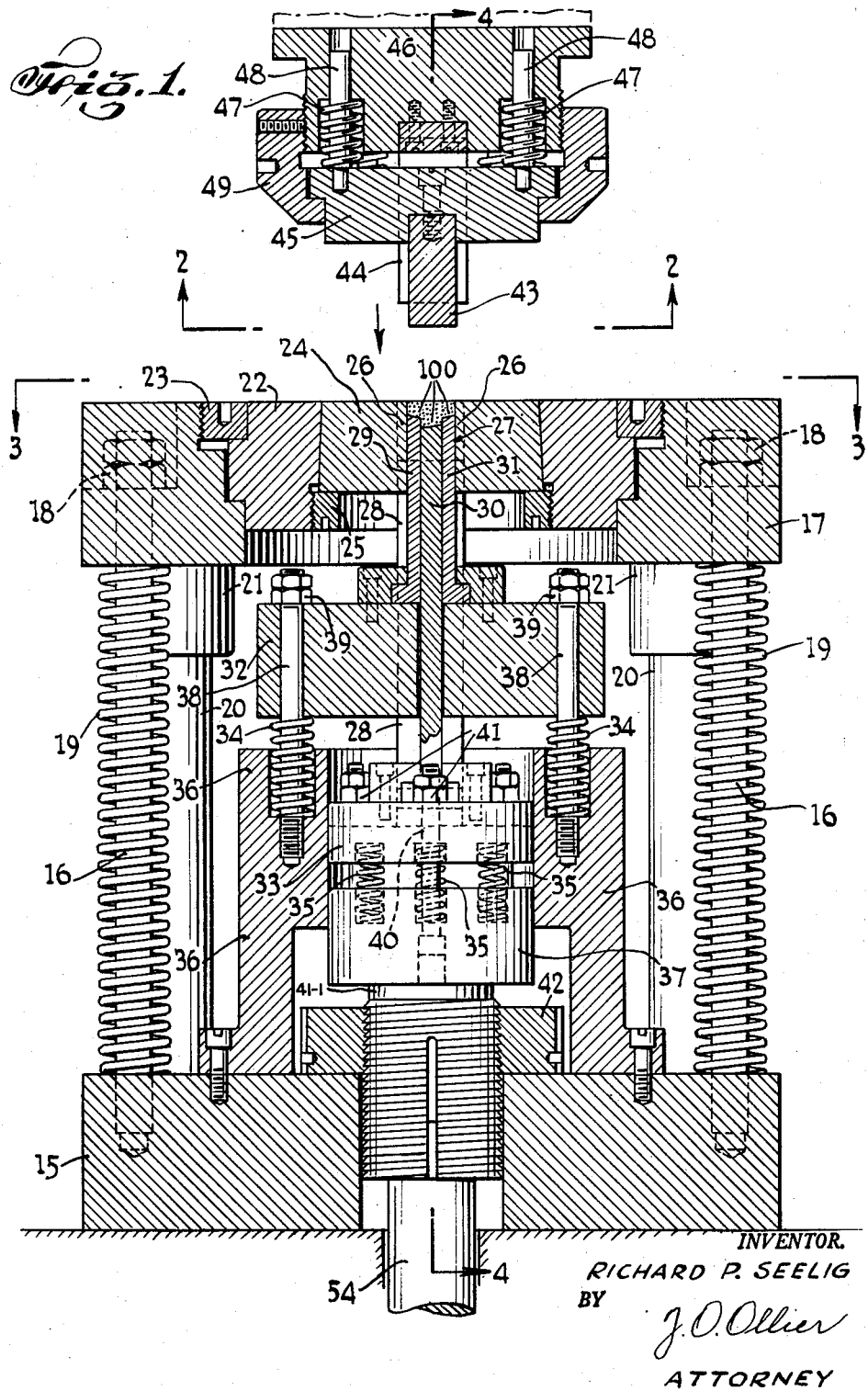
Figure 7:
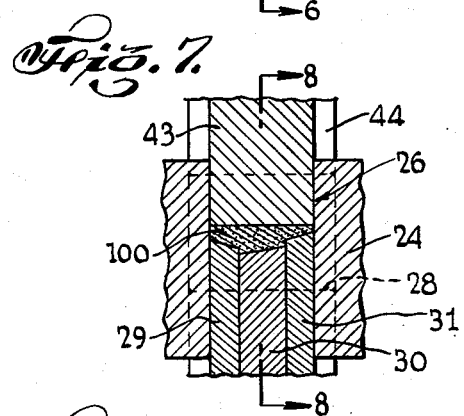
Figure 8:
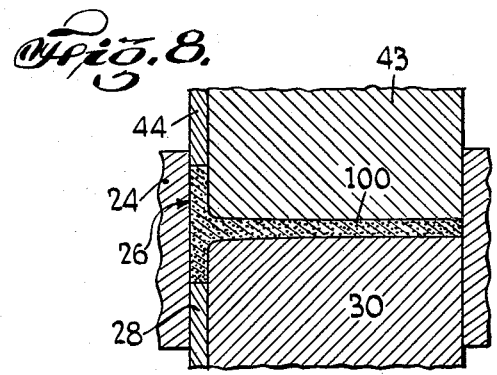
Figure 9:
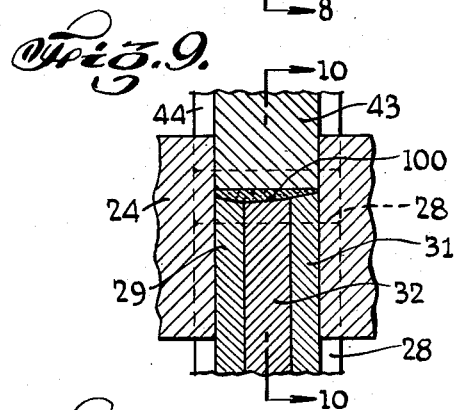

These and other objects of the invention will be more clearly understood as the specification proceeds with reference to the drawings, in which, by way of exemplification, Fig. 1 shows a vertical cross section with parts in elevation of essential elements of an open press for preshaping a blade from metal powder, Fig. 2 a bottom view of the upper punch assembly and adapter parts along line 2—2 in Fig. 1, Fig. 3 a plan view of the die and die adapter along the line 3—3 in Fig. 1, Fig. 4 a cross section of the punch and die assembly along line 4—4 in Fig. 1, Figs. 5, 7, 9, 11 vertical cross sectional views on a larger scale, taken in the same plane as Fig. 1, of the upper and lower punch and die assemblies in different compressional positions, and Figs. 6, 8, 10 and 12 vertical cross sectional views along lines 6—6, 8—8, 10—10, 12—12, respectively, in Figs. 5, 7, 9 and 11, Figs. 9a and 9b vertical sectional views of modifications of the structure shown in Fig. 9, Fig. 13 a view similar to Fig. 1 of an open die for finally shaping the preshaped blade, Fig. 14 a bottom view along line 14—14 of the upper die and punch assembly shown in Fig. 13, Fig. 15 a plan view of the lower die and die adapter along line 15—15 in Fig. 13, Figs. 16, 18 and 20, on a larger scale, successive compressional positions of the dies in the final shaping operation and Figs. 17, 19 and 21, re-

2 spectively, vertical cross sectional views along lines 17—17, 19—19 and 21—21 in Figs. 16, 18 and 20, respectively, Fig. 22 on a still larger scale along line 22—22 in Fig. 19, the final shaping dies in closed position with an interposed blade seen endwise, and Fig. 23 a side view of the finally shaped blade.

Referring to Fig. 23 first, the blade 10 is provided with a root 11 for insertion in a groove or the like of a supporting wheel or disc or a stationary diffusor. The blade tapers over a part of its length from the root; its thickness varies over its cross section similar to that of an airfoil. There is also a longitudinal twist of the blade, as appears from Fig. 23.

To manufacture such complicated shapes is obviously difficult and expensive, because of the considerable twist and highly curved surfaces of the blade, it is also impossible to press it in a single step from a metal powder.

Therefore, a preshape is molded from the metal powder and is finally shaped in at least one subsequent step.

If blades are concerned which are produced in a combined powder metallurgical and infiltration process, a porous compact or preshape is molded first and thereafter infiltrated with a metal of lower melting point than that of the porous shape. For the porous shape, ferrous metal powder is preferred and in particular pure reduced iron to which carbon in amounts up to about 0.25 to 0.4% may be added in solid form, such as of finely divided graphite. This initial powder is filled into the preshaping or molding die.

Referring to Figs. 1 and 4, the lower portion of the punch and die assembly includes a bolster plate 15 in which a plurality of stripper bolts 16 are mounted which pass slidingly through holes in the die holder 17. The stripper bolts are provided with stop nuts 18 to limit the upward movement and define the upper position of the die holder 17. Springs 19 surrounding the stripper bolts 16 hold the die holder 17 yieldingly in its upper position. Guide posts 20 mounted on the bolster plate 15 pass slidingly through bushings 21 and in holes in the die holder 17.

The die retainer 22 is secured against a shoulder in the die holder 17 by means of a ring nut 23. The die 24 is inserted into its retainer 22 and held by a ring nut 25. The die cavity comprises a portion 26 to form the root and another portion 27 to form the blade proper of a turbine blade. In the portion 26 of the die cavity, a punch 28 is movably arranged, whereas in the portion 27, three complementary punches 29, 30 and 31 are movably arranged. The punch 28 extends through the punch holder 32 and is rigidly mounted on the punch holder 37. Punches 29 and 31 are mounted on a punch plate 32 and thereby moved in unison whereas punch 30 passes through punch plate 32 and is mounted on another punch plate 33, the two plates being yieldingly mounted on sets of springs 34 and 35 respectively. The springs 34 are supported by a punch stop 36, and the springs 35 are mounted on the punch stop 37. The uppermost position of punch plate 32 is defined by guides 38 mounted on punch stop 36 and having stop nuts 39. The upper position of punch plate 33 is similarly defined by guides 40 and stop nuts 41. Punch stop 36 is mounted on the bolster plate 15, whereas the downward projection 41—1 of punch stop 37 engages an adjustment nut 42 which rests on the bolster plate 15.

The upper punch assembly includes a punch 43 to fit in die cavity portion 27, and another punch 44 to fit in die cavity portion 26. Punch 43 is mounted in a punch plate 45 which is spaced from punch holder 46 by means of pressure springs 47 and guide pins 48. Cap 49 defines the lowermost position of punch plate 45 with respect to the punch holder 46. Punch 44 is rigidly mounted on punch holder 46.

The complementary punches 29, 30 and 31 are shown in Fig. 1 in their initial positions to provide a sufficient column of powder (powder fill portion) 100 above each punch so that upon compression the respective columns or portions of the fill are compressed in the desired compression ratios.

Similarly, punch 28 is positioned so that the measured fill portion above it, upon compression, will form the root at the desired compression ratio.

The powder is filled into the die cavity portions 26 and 27 flush with the top surface of the die. Thereby the amount of metal powder filled in the die is predetermined within close tolerances.

Figure 5:
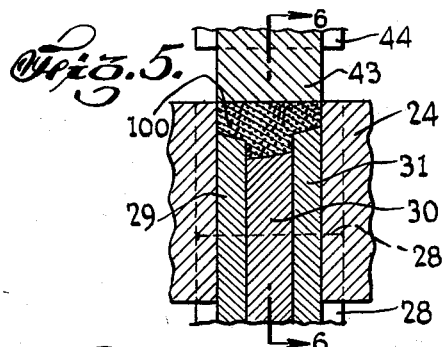
Figure 6:
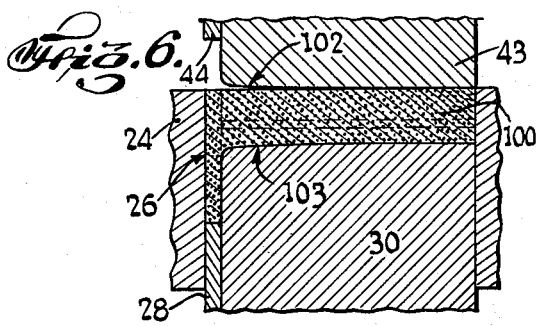

Upon lowering the upper punch assembly, punch 43 contacts the upper surface of the powder fill 100 (Figs. 5, 6).

Upon further continued motion of the upper punch assembly, punch 43 enters portion 27 of the die cavity and compresses the powder therein; the compression force translated through the powder moves the lower punches 29, 30 and 31 downwardly against the pressure of springs 34 and 35. Since the fill portions above punches 29, 31 are of less depth than that of the fill portion above punch 30, Fig. 5, punches 29, 31 will travel downwardly a greater distance than punch 30 in order that the pressure surfaces of these punches be brought into register by the time the powder fill has been compressed. Punch 44 enters the die cavity portion 26 after punch 43 has moved downwardly in the portion 27 of the die cavity to some extent, and compresses the portion of the fill in the cavity portion 26.

Shortly after compression started, punch 43 retracted against the pressure of springs 47 in its uppermost position relative to the punch plate support 46.

Punches 29, 31 yield to a greater extent than does punch 30, and intermediate relative positions of the three punches are shown in Figs. 7, 8 with the upper root punch 44 having entered to some extent into the cavity portion 26. It will be observed that the cooperating root punches 44 and 28 are rigidly mounted on the respective punch holders 46 and 47.

Figure 10:
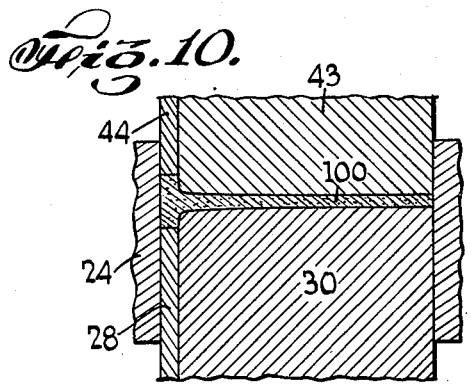

Upon full compression as shown in Figs. 9, 10, the pressing surfaces of the complementary punches 29, 30, 31 are in register; the blade portion 100 has been compressed and formed with flat edge faces and the root portion between the punches 44 and 28 has likewise been compressed to form the desired porous preshape. During compression, the die plate 17 was moved downwardly slightly against the action of the pressure springs 19 by virtue of the friction between the powder fill and the confining surfaces of the die.

In this exemplification of the invention, the pressing surface of punch 43 is shown flat. Instead, this pressing surface may be curved laterally as indicated by line 50 in Fig. 9a.

In order to avoid sharp corners on the preshape and to approximate more closely the shape of the edges of the final shape, sharp projections or chamfers 51, 52, can be provided on the sides of punch 43 as shown in Fig. 9b; the surface between the chamfers is preferably curved as is also shown in Fig. 9b, to approximate the final shape.

Figure 11:
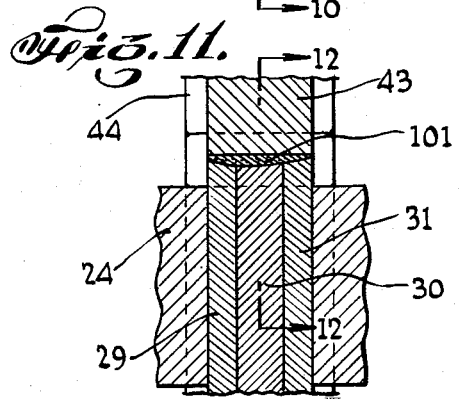
Figure 12:
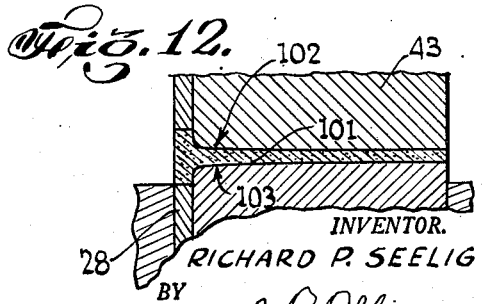

The thus compacted porous preshape is ejected by lifting the punches 29, 30, 31 simultaneously. To this effect, an ejector rod 54, Figs. 1, 4, attached to the downward projection 41 of the punch support 37 moves the latter upwardly, whereby punch 30 and the root punch 28 are lifted in unison and lift the preshape. This lifting and ejection of the preshape is permitted by simultaneous retraction of the punch holder 46 with the root punch 44, punch plate 45 and punch 43. The retraction of the punch holder 46 may permit some expansion of the springs 47 but is preferably so regulated as to maintain sufficient pressure by the punch 43 on the preshape to prevent injury to the edge portions of the preshape from friction with the side walls of the die 24. The ejection continues until the preshape 101 is lifted above the top surface of the die 24 as shown in Fig. 11, whereupon the upper punches 43, 44 are fully retracted so that the preshape is cleared and can be removed. Thereafter, all the punches are returned to their initial positions as shown in Figs. 1, 4 and another cycle of compaction can be started.

The preshape or compact is now sintered and the sintered compact is to be given its final shape.

For this purpose, the die assembly shown in Figs. 13, 14, 15 is used. It includes a die retainer 55 slideably arranged on stripper bolts 56 which are mounted in a bolster plate 57. Pressure springs 58 tend to move the retainer plate 55 against stop nuts 59 on bolts 56. A lower die 60 is mounted in retainer plate 55 by means of a ring 61 secured thereto by means of screws 62. A punch 63 for finally shaping the root is secured to punch plate 64 which rests on bolster plate 57 and is guided within a lower stop 65 for the lower die 60. Root punch 63 is movable within a slot 67 in die 60. Die 60 is provided with a pressure surface 66 corresponding to the final shape of the lower surface of the blade proper.

The upper die and punch assembly comprises the die 68 provided with a pressure surface 69 which corresponds to the final shape of the upper surface of the blade proper. The upper die is further provided with a slot 70 in which the upper root punch 71 is movable. The latter is rigidly mounted on the die support 72. Pins 73 are mounted in die 68 and passed through holes 74 in die support 72. These pins have heads to limit the distance between the die and the die support. Pressure springs 75 are interposed between die support 72 and die 68 tending to move the latter into its lowermost position. Holes 76 in die 68 register with dowel pins 77 projecting from die 60 in order to align the two dies during operation.

Removable stops 78 are provided on the upper surface of die 68 so that in case the root of the final shape becomes stuck in the upper die cavity 69 or slot 70, upon removal of the stops, the die can be moved further upwardly relative to support 72 and the root punch 71 can eject the blade from the die cavity or slot 70.

Upon insertion of the preshape between the dies with the root in the slot or cavity 67, and upon lowering of the upper die and punch assembly, the dies make contact in the manner as shown in Figs. 16, 17.

Upon increasing the pressure, the dies 60, 68 float respectively downwardly and upwardly in relation to their holders; overcoming the pressures of the springs 58, 75, respectively, so that ring 61 hits home on stop 65, die support 72 hits home on stops 78, Fig. 13, whereby the root punches 63 and 71 come into contact with the adjacent surfaces of the root 104 of the preshape as shown in Figs. 18 and 19.

In compressing the blade, part of the material of the blade is displaced laterally in a swaging action and also the predetermined twist is imparted to it. Thus a shaping and twisting and not merely a sizing operation is performed.

The cavity between the final die surfaces 66 and 69, shown in Fig. 13, is slightly wider than the die cavity in the preliminary die 24, shown in Fig. 1, in order that the metal under the pressure of the final dies may be forced laterally toward the side edges of the cavity, thus widening, shaping and increasing the density of the metal edges of the compacted shape. The pressure for this purpose is most effective near the edges of the shape, the central longitudinal portion of the shape being less compressed to a more or less porous condition, if desired, and the pores thereof infiltrated later with a suitable metal or metal alloy. The central longitudinal portion is more porous than the edge portions and a filling of the pores of the preshape with the infiltrant produces a more uniform blade density and consequently more uniform physical properties of the blade. The parts of the upper die assembly return to their initial position as shown in Fig. 13. The parts of the lower die and punch assembly return also to their initial positions. Now the ejector pins 80 lift the punch plate 64 and thereby root punch 63 relative to die 60, whereby the finally shaped blade is lifted above the lower die surface into the position as shown in Fig. 20 and is now free and can be removed from the press.

If it is difficult in a single final shaping operation as described to obtain the final shape of the blade, such as in cases of extreme twists of the blade, the final shaping operation can be subdivided into more than one step. The shape should be annealed between these steps at about 700° C. if pure iron powder has been used for its manufacture.

In the preshaping operation, the exact amount of material is compacted to a preshape as close as possible to the final shape. In a second shaping step, the edges of the blade proper are created by lateral displacement of material toward the edges of the blade and by densifying its porous structure, and in the third step the twist is imparted to the blade and a final sizing given to it.

After the porous preshape has been compacted, sintered, further sized under pressure and infiltrated, it is often advantageous to apply final sizing and twisting pressure to the surfaces of the infiltrated preshape.

A blade or bucket can be shaped in the process hereinbefore described from highly refractory metal, such as molybdenum, tungsten or an alloy of both. The finally shaped, and if required, sized (coined) blade or bucket is usually dense. If, in the production of blades or buckets of larger size from molybdenum or tungsten, a presintering step has been interposed between the two shaping steps, the final shape may not yet be dense enough to exhibit greatest rigidity and strength. In such case, the final shape can be subjected to a high sintering treatment to fully densify it and a sizing (coining) step applied only to the high sintered shape, if required. A corrosion resistant coating, such as of chromium, titanium, aluminum and chromium borides is applied thereafter. The titanium or aluminum is oxidized thereafter to form a dense corrosion resistant coating on its outside. If the presintered finally shaped body is still porous, it can be infiltrated with a suitable metal instead of being high sintered. For instance, it can be infiltrated with silver which alloys with molybdenum and tungsten, whereby a fully dense body of high rigidity and strength is obtained. The infiltrant can also form a thin coating on the final shape and be used as an intermediary layer for applying thereto a desired corrosion resistant outer layer. If a melt of titanium is used as infiltrant which also alloys with molybdenum and tungsten to some extent, a thin layer formed therefrom on the final shape can be oxidized on its outside to form the desired dense and corrosion resistant coating.

If ferrous metal powder is used for producing the final shape in the manner hereinbefore described, it is preferred to use pure iron powder of suitable fine particle size to obtain a porous final shape which is infiltrated thereafter with a suitable copper alloy. It is advantageous in such cases to have carbon present in the ferrous shape, up to about 0.25 to 0.4%. Whereas such carbon can be admixed in finely divided solid state, such as in the form of lamp black, to the initial iron powder, it is preferred to treat the preshape of greater porosity than the final shape with a gaseous carbon discharging medium, such as carbon monoxide, by exposing the preshape to an atmosphere of the gas at a temperature above 723° C. and preferably within presintering range of the preshape so that the latter is carburized to the desired extent stated and simultaneously presintered. It is also possible to carburize a still porous final shape in the manner described. The copper alloy is infiltrated into the carburized or carbon containing ferrous final shape. In cases where carburization of the shape is effected from the gas phase or solid carbon has been admixed with the initial iron powder, the proper shaping of the edges in the final shaping operation sometimes causes difficulties and the edges are therefore decarburized to desired extent before the final shaping operation. To this effect, the preshape is covered with refractory material but leaving free the edges to be decarburized, and the latter are exposed to a moisture containing atmosphere at about 1150° C. for a time period sufficient to effect the desired degree of decarburization of the edges. In other cases, the final shape can be formed without endangering the edges but the sizing (coining) operation is apt to cause cracks in the edges; the latter can be decarburized to desired extent in the manner described before sizing.

The infiltration of a melt of a suitable metal in a porous final shape of molybdenum, tungsten or iron sometimes causes difficulties in that the ends of the pores in surface layers have been closed in the final shaping operation; in such cases, the pore ends can be opened by dipping the final shape in a proper acid.

If a blade or bucket of ferrous material infiltrated with a copper alloy contains carbon, it can be heat treated after infiltration in order to improve its physical properties, for instance it can be heated for one half hour at about 840° C., quenched in oil, redrawn for one half hour at about 680° C. and quenched again in oil and cooled in air.

Summarizing, the present invention is directed to a method for forming by powder metallurgy technique a fluid-guiding shaped body, such as a compressor blade of the type shown in Fig. 23, having generally curved longitudinally extending opposite side surfaces of substantial width and a longitudinal leading edge region and a longitudinal trailing edge region of smaller thickness than its center region, such as indicated by the cross-section of the cavity 10 of the final shaping die shown in Fig. 22. In accordance with the invention, a metallic powder mass is first compacted into a porous compact of materially smaller width than the desired shaped body, the porous compact being formed with generally flat opposite edge surfaces such as indicated by the die cavity in Fig. 9, with the thickness of its leading edge region being greater than the thickness of the trailing edge, and the center region being greater than the two edge regions. The so produced shaped porous compact is thereafter sintered at an elevated sintering temperature for increasing its strength. The sintered compact is then subjected to a further shaping operation by forming pressure applied against its opposite wide side surfaces for laterally displacing the sintered powder mass of the trailing edge region of the compact and thereby forming it into a sintered porous body of a shape and width substantially corresponding to that of the desired fluid-guiding body. The so further shaped sintered compact is thereafter infiltrated with an infiltrant metal of lower melting temperature than the metal of the compact for increasing the density and the strength of the sintered and further shaped body.

What I claim is:

1. In the method of forming a fluid-guiding shaped body, such as a compressor blade, having generally curved longitudinally extending opposite side surfaces of a certain width and at least one longitudinal edge having a thickness less than half the maximum thickness of its center region, the procedure comprising compacting a metallic powder mass into a porous compact of materially smaller width than said shaped body having generally flat opposite edge surfaces and with the thickness of at least one edge region of the compact being greater than the thickness of the corresponding longitudinal edge of said shaped body, sintering said porous compact at an elevated sintering temperature for increasing its strength, thereafter applying further forming pressure against the opposite side surfaces of said sintered compact for laterally displacing the sintered powder mass of said one edge region thereof for forming said compact into a sintered porous shaped body of a shape substantially corresponding to said fluid-guiding body of desired width and thereafter infiltrating the sintered shaped porous body with an infiltrant metal of lower melting temperature than the metal of said compact for increasing the density and strength of said body.

2. In the method of forming a fluid-guiding shaped body, such as a compressor blade, having generally curved longitudinally extending opposite side surfaces of a certain width and a longitudinal leading edge and a longitudinal trailing edge of smaller thickness than its center region with the trailing edge region being less than half the thickness of said center region, the procedure comprising compacting a metallic powder mass into a porous compact of materially smaller width than said shaped body having generally flat opposite edge surfaces and with the thickness of its longitudinal edge regions being greater than the thickness of the corresponding longitudinal edges of said shaped body, sintering said porous compact at an elevated sintering temperature for increasing its strength, thereafter applying further forming pressure against the opposite side surfaces of said sintered compact for laterally displacing the sintered powder mass of said trailing edge region thereof for forming said compact into a sintered porous shaped body of a shape substantially corresponding to said fluid-guiding body of desired width, and thereafter infiltrating the sintered shaped porous body with an infiltrant metal of lower melting temperature than the metal of said compact for increasing the density and strength of said body.

3. The method as claimed in claim 1, wherein a longitudinal twist is imparted to the sintered body in the further forming operation.

4. The method as claimed in claim 2, wherein a longitudinal twist is imparted to the sintered body in the further forming operation.

RICHARD P. SEELIG.

References Cited in the file of this patent

UNITED STATES PATENTS

| Number | Name | Date |
|---|---|---|
| 1,965,670 | Schauer | July 10, 1934 |
| 2,019,329 | Warren | Oct. 29, 1935 |
| 2,298,885 | Hull | Oct. 13, 1942 |
| 2,386,604 | Goetzel | Oct. 9, 1945 |
| 2,412,615 | Howard | Dec. 17, 1946 |
| 2,422,193 | Hague | June 17, 1947 |
| 2,425,053 | Swinehart | Aug. 5, 1947 |
| 2,431,660 | Gaudenzi | Nov. 25, 1947 |
| 2,435,511 | Rice | Feb. 3, 1948 |
| 2,449,257 | Tucker | Sept. 14, 1948 |
| 2,449,515 | Seelig | Sept. 14, 1948 |
| 2,456,779 | Goetzel | Dec. 21, 1948 |
| 2,520,373 | Price | Aug. 29, 1950 |
| 2,540,457 | Rice | Feb. 6, 1951 |

FOREIGN PATENTS

| Number | Country | Date |
|---|---|---|
| 551,326 | France | Jan. 6, 1923 |
| 523,318 | Great Britain | July 11, 1940 |